July 19, 1960  H. R. CALER ET AL  2,945,397
ADJUSTABLE CAM
Original Filed Aug. 26, 1957  2 Sheets-Sheet 1
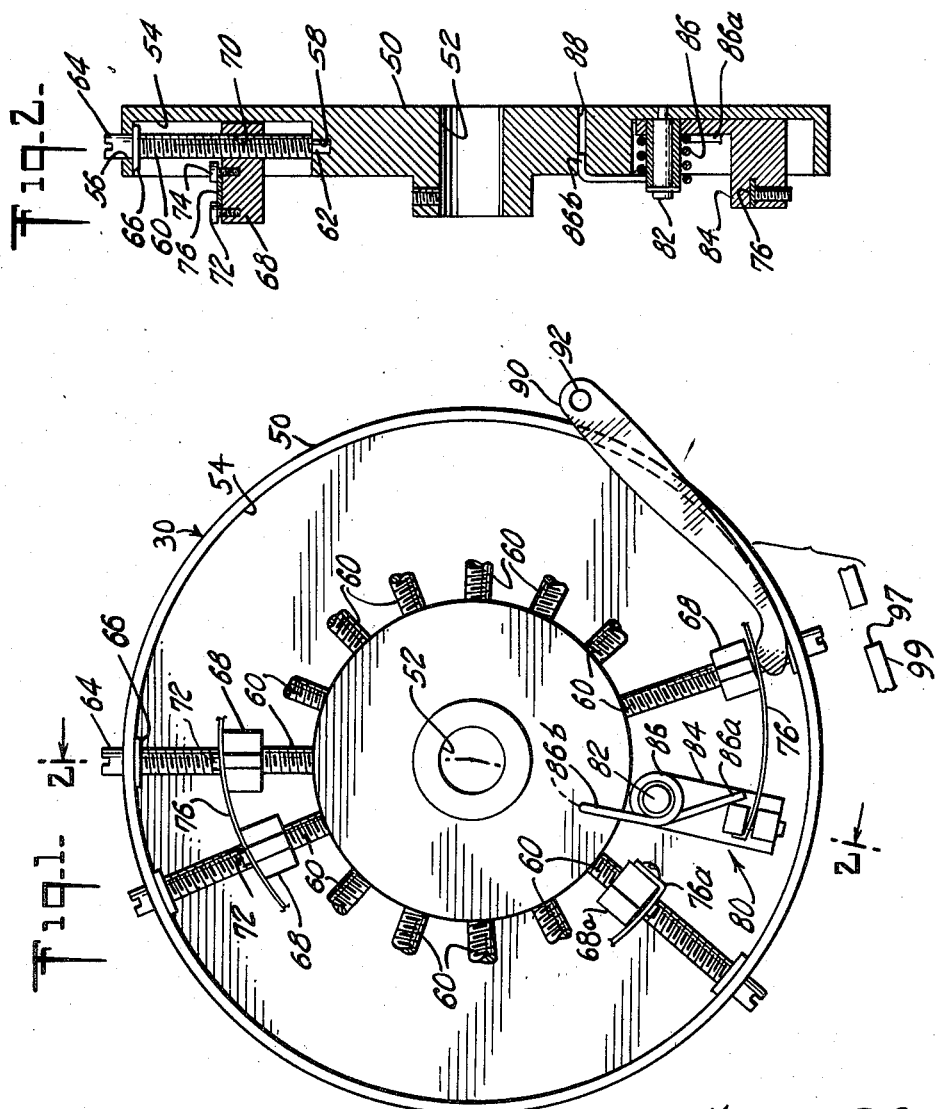
HERSCHEL R. CALER
MATTHEW RUSSO
EDWARD N. SINGER
INVENTORS:
BY
Max D. Farmer
ATTORNEYS:

July 19, 1960  H. R. CALER ET AL  2,945,397
ADJUSTABLE CAM
Original Filed Aug. 26, 1957  2 Sheets-Sheet 2
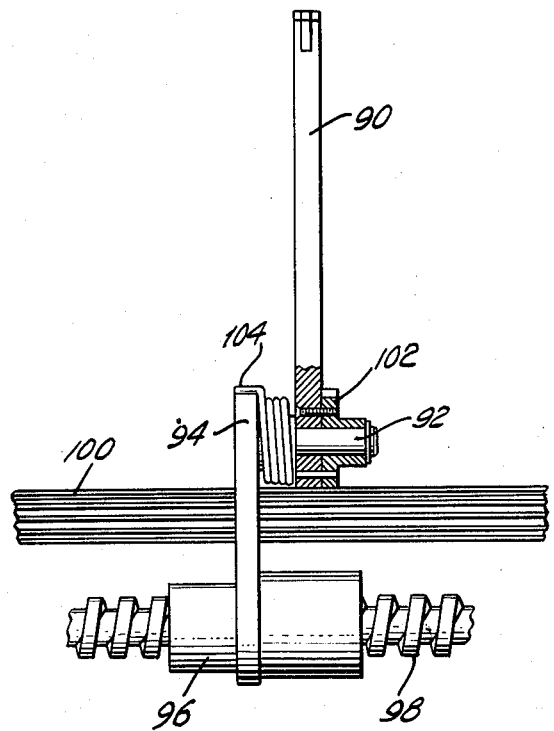
HERSCHEL R. CALER
MATTHEW RUSSO
EDWARD N. SINGER
INVENTORS:
BY
Max D. Farmer
ATTORNEYS:

United States Patent Office 2,945,397
Patented July 19, 1960

2,945,397
ADJUSTABLE CAM

Herschel R. Caler, Baltimore, Md., and Matthew Russo, Brooklyn, and Edward N. Singer, Queens Village, N.Y., assignors to the United States of America as represented by the Secretary of the Navy Original application Aug. 26, 1957, Serial No. 680,368. Divided and this application Jan. 30, 1959, Ser. No. 795,884

1 Claim. (Cl. 74—568)

(Granted under Title 35, U.S. Code (1952), sec. 266)

The invention described herein maybe manufactured and used by or for the Government of the United States of America for governmental purposes without the payment of any royalties thereon or therefor.

This application is a division of application Serial Number 680,368, filed August 26, 1957.

An object of this invention is to provide an improved adjustable cam which is relatively inexpensive, easy to adjust, and easy to use.

Other objects and many of the attendant advantages of this invention will be readily appreciated as the same becomes better understood by reference to the following detailed description when considered in connection with the accompanying drawings wherein:

Figs. 1 and 2 are plan and sectional views respectively of an embodiment of an adjustable cam in accordance with this invention; and Fig. 3 is a plan view partly in section of a cam follower arrangement for use with several cams on a common shaft.

The cam 30 shown in Figs. 1 and 2 includes a main body member 50. The main body member 50 is formed with a central bore 52 and a circular channel 54. Radially aligned holes 56 and 58 are formed in the body member 50 at angularly spaced intervals. The body member 50 is so fabricated that the spacing corresponds to selected arcuate intervals of significance in selected circumstances in which the cam is used. A screw member 60 is rotatably supported in each pair of holes 56 and 58. The intermediate portion of each screw member is threaded. One end of the screw member 60 is formed as a short reduced diameter section 62 for a sliding fit in the hole 58. The other end of the screw member 60 is formed as a slotted circular head 64 for a sliding fit in the hole 56. Just beneath the head, the screw member 60 is formed with a circular groove, not shown, for receiving a retaining ring 66. The screw member 60 is accurately machined so that its length between the reduced portion 62 and head 64 is equal to the width of channel 54. There is substantially no play between the screw member 60 and the main body member 50. A traversing block 68 threadedly engages each of the screw members 60, respectively. The radial dimension of the traversing blocks 68 is a fraction of the radial dimension of the circular channel 54; their length exceeds the depth of channel 54 so that when bearing against the bottom of channel 54, the block projects to a substantial extent beyond the main body member 50. The width dimension of the traversing block is stepped so that it is wider at its inner end portion within the channel than at its portion protruding beyond the channel. The width of each traversing block 68 is such that two adjacent blocks will not interfere with one another when moved to their innermost limit of travel. The distance between the axis of the threaded hole 70 and one end of each traversing block 68 is substantially equal to the distance between the axis of aligned holes 56 and 58 and the bottom of the channel 54 so that when the traversing blocks 68 are assembled on the screw members 60 they abut the bottom of the channel 54 so that they cannot wiggle about their respective screw members 60. A pair of accurately spaced apart screws 72 and 74 are threaded into the outer side of each traverse block 68. The screws 72 and 74 are formed with a step under the head so that the heads do not seat against the surface of the traverse block 68. An elongated flat ribbon spring 76 of the type used as a mainspring in a clock slidably engages the reduced width portion of each traverse block 68 and the stepped portions of screws 72 and 74.

One end 76a of the flat ribbon spring is secured to one of the traverse blocks 68a. The other end of the flat ribbon spring 76 is secured to a tension device 80. The tension device 80 includes a pivot post 82 secured to the bottom of channel 54 and a pivot arm 84 assembled on the pivot post 82. The portion of the pivot arm 84 engaging the post is cylindrical. A coiled torsion spring 86 is assembled over the cylindrical portion of the pivot arm 84. One end 86a of the torsion spring 86 abuts the pivot arm 84 and the other end 86b seats in a hole in the main body member 50. The other end 76b of the flat ribbon spring 76 is secured to the pivot arm 84 by any convenient means. When a traverse block is moved to a position closer to the axis of the main body member 50, the pivot arm 84 moves clockwise to take up the slack in the flat ribbon spring; when a traverse block is moved to a position further from the axis of the main body portion, the pivot arm is moved counterclockwise against the bias of the spring 86. If it is expected that the arm 84 could not yield or take to the extent necessary, a drum-like member can be substituted for the arm 84.

The cam follower 90 is pivotally mounted on a pin 92. The pin 92 is secured to an arm 94 (Fig. 3) which in turn is secured to traverse nut 96. The nut engages an elongated traverse screw 98 that is manually rotatable. The elongated screw 98 is supported parallel to a shaft, not shown, for supporting several cams 30 therealong and is located alongside the cams. An elongated rotatably supported pinion 100 is located alongside the screw 98. The pinion is mechanically coupled to a control element, not shown, e.g., a gain control as in the parent application. A gear 102 pivotally mounted on pivot pin 92 is secured to cam follower 90 and is oscillatable therewith. A torsion spring 104 continuously biases the cam follower arm against the flat ribbon spring of the cam. The cam follower arm is manually movable out of engagement with a cam 30 so the traverse screw 98 may be rotated to move the cam follower to another cam.

The cam follower 90 engages the flat ribbon spring 76 of one of the cams 30. The cam follower arm is sufficiently long so that whether the traverse block is at the innermost limit of its travel, the outermost limit of its travel, or anywhere between, the follower engages the flat ribbon spring substantially along a radial line from the axis of cam 30. The screw member 60a, which is the screw member positioned adjacent the end of the arm 90, is engageable by a screw driver extended through an access opening 97 in the housing 99 of the equipment. The span of flat ribbon spring 76 between each pair of adjacent traverse blocks 68 presents a smoothly curved surface.

When the equipment described is assembled the cams are adjusted before being mounted on their shaft. The traverse blocks 68 are located in the most logical positions initially. The traverse blocks all are initially positioned either closer to one end of their travel or closer to the other end of travel or in between, depending upon the circumstances. Then the cams are each arcuately positioned and secured on their shaft so that the screw members 60 are aligned with the hole 97 in housing 99 when the associated equipment is set at selected significant settings. The cam follower 90 is held free of the cams 30 while the traverse screw 98 is rotated to position the selected cam follower adjacent the cam 30. When the cam shaft is rotated, the spring biased follower 90 is in continuous engagement with the selected cam and drives the pinion 100 in accordance with its arcuate movement in following the changes in radius of the cam surface of the selected cam.

Obviously many modifications and variations of the present invention are possible in the light of the above teachings. It is therefore to be understood that within the scope of the appended claim the invention may be practiced otherwise than as specifically described.

We claim:

An element having a transversely adjustable, linearly extending reference surface comprising a support, an elongated laterally flexibly resilient member which is substantially nonextensible and noncontractible lengthwise under normal use, disposed along said support, a plurality of means arranged at intervals along said support and individually embracing and slidingly coupled to local sections of said member for holding said local sections of said member in a selected relation to said support, and each individually operable to adjust positively in both directions transversely of the length of the member the local section of said member to which it is coupled, means carried by said support and coupled to one end of said member for anchoring it, and additional means also carried by said support and coupled to the other end of said member and applying thereto a lengthwise pull sufficient to hold said member taut under different conditions of adjustment of said local sections of said member and permit lengthwise adjustment of said member, said additional means including an arm pivoted to said support and at a part thereof which is spaced from its pivot, connected to an end of said member and rockable in a direction to pull said member taut, and resilient means for rocking said arm in said direction to pull said member taut.

References Cited in the file of this patent

UNITED STATES PATENTS

| | | |
|---|---|---|
| 1,131,953 | Pilkington | Mar. 16, 1915 |
| 1,854,239 | Weiland | Apr. 19, 1932 |
| 2,322,031 | Kuebert | June 15, 1943 |
| 2,409,130 | Lear | Oct. 8, 1946 |
| 2,589,852 | Overacker | Mar. 18, 1952 |
| 2,590,837 | Axler | Apr. 1, 1952 |

FOREIGN PATENTS

| | | |
|---|---|---|
| 395,674 | Great Britain | Oct. 14, 1931 |
| 721,410 | France | Mar. 3, 1932 |